United States Patent
Raye et al.

(10) Patent No.: US 9,834,192 B2
(45) Date of Patent: Dec. 5, 2017

(54) AUTOMATIC AIR TANK PURGE SYSTEM

(71) Applicant: HALDEX BRAKE PRODUCTS CORPORATION, Kansas City, MO (US)

(72) Inventors: Victor J. Raye, Kansas City, MO (US); David G. Engelbert, Weatherby Lake, MO (US)

(73) Assignee: HALDEX BRAKE PRODUCTS CORPORATION, Kansas City, MO (US)

( * ) Notice: Subject to any disclaimer, the term of this patent is extended or adjusted under 35 U.S.C. 154(b) by 0 days.

(21) Appl. No.: 13/830,178

(22) Filed: Mar. 14, 2013

(65) Prior Publication Data

US 2014/0251437 A1 Sep. 11, 2014

Related U.S. Application Data

(60) Provisional application No. 61/772,822, filed on Mar. 5, 2013.

(51) Int. Cl.
| | |
|---|---|
| *F16D 65/22* | (2006.01) |
| *B60T 17/04* | (2006.01) |
| *B60T 17/00* | (2006.01) |

(52) U.S. Cl.
CPC ............ *B60T 17/04* (2013.01); *B60T 17/004* (2013.01); *Y10T 137/0318* (2015.04); *Y10T 137/8593* (2015.04)

(58) Field of Classification Search
CPC .................................................... B60T 17/004
USPC ...................................... 137/203, 204, 625.5
See application file for complete search history.

(56) References Cited

U.S. PATENT DOCUMENTS

| | | | |
|---|---|---|---|
| 891,808 A | 6/1908 | Adams | |
| 948,344 A | 2/1910 | Radick | |
| 1,001,040 A | 8/1911 | Johnsonbaugh | |
| 2,077,515 A | * 4/1937 | Campbell | ..................... 137/204 |
| 2,328,649 A | 9/1943 | Jerome | |

(Continued)

FOREIGN PATENT DOCUMENTS

FR 1363011 4/1964

OTHER PUBLICATIONS

"Suspension Controls," Haldex, Brochure L00096W (Feb. 2010).*

(Continued)

*Primary Examiner* — Nicholas J Lane
(74) *Attorney, Agent, or Firm* — Stinson Leonard Street LLP

(57) ABSTRACT

The present invention provides a system that automatically purges contaminants from an air pressure tank when the emergency brakes of a vehicle are set. In one preferred embodiment, the system comprises a valve comprising an input port, an exhaust port, and a control port. The input port is in fluid connection with a drain on the pressurized air tank, and the control port is in fluid connection with an emergency brake line of the vehicle. When the emergency brakes are engaged, the valve is open such that the input port and the exhaust port are in fluid connection operable for air and contaminants from the pressurized air tank to be expelled from the pressurized air tank through the exhaust port. When the emergency brakes are not engaged, the valve is closed such that the input port and exhaust port are not in fluid connection.

37 Claims, 6 Drawing Sheets

(56) References Cited

U.S. PATENT DOCUMENTS

| | | | |
|---|---|---|---|
| 2,383,244 A | | 8/1945 | Farmer |
| 2,418,440 A | | 4/1947 | White et al. |
| 2,485,232 A | | 10/1949 | Brown |
| 2,509,597 A | * | 5/1950 | Hamilton ............... 137/204 |
| 2,509,880 A | * | 5/1950 | Pelton ............... 137/204 |
| 2,687,841 A | | 8/1954 | Churchman |
| 2,810,393 A | | 10/1957 | Fites |
| 3,101,091 A | * | 8/1963 | Schultz ............... 137/204 |
| 3,262,464 A | | 7/1966 | Frantz |
| 3,298,387 A | * | 1/1967 | Page ............... 137/203 |
| 3,533,433 A | * | 10/1970 | Berg ............... 137/204 |
| 3,575,199 A | | 4/1971 | Beattie |
| 3,580,267 A | | 5/1971 | Baker |
| 3,659,625 A | * | 5/1972 | Coiner et al. ............... 137/204 |
| 3,682,194 A | * | 8/1972 | Pyle ............... 137/204 |
| 3,977,426 A | | 8/1976 | Pyle |
| 4,030,517 A | * | 6/1977 | Pyle ............... 137/203 |
| 4,146,275 A | | 3/1979 | Elliott et al. |
| 4,877,218 A | * | 10/1989 | Kasner ............... 251/61.3 |
| 4,883,995 A | | 11/1989 | Rink, Jr. |
| 4,928,724 A | | 5/1990 | Margerum |
| 4,987,919 A | | 1/1991 | Boutin |
| 5,144,974 A | | 9/1992 | Gaudin |
| 5,154,204 A | | 10/1992 | Hatzikazakis |
| 5,205,315 A | * | 4/1993 | Margerum ............... 137/204 |
| 5,286,283 A | * | 2/1994 | Goodell ............... B60T 17/004 96/113 |
| 5,435,422 A | | 7/1995 | Chille, Sr. |
| 5,592,754 A | | 1/1997 | Krieder et al. |
| 5,709,246 A | * | 1/1998 | Koelzer ............... 137/627.5 |
| 5,738,138 A | | 4/1998 | Grunert et al. |
| 5,762,094 A | * | 6/1998 | Hendershot et al. ............... 137/204 |
| 5,865,208 A | | 2/1999 | Chovan |
| 5,941,271 A | * | 8/1999 | Chovan ............... 137/204 |
| 5,947,239 A | * | 9/1999 | Koelzer ............... 188/352 |
| 6,109,289 A | * | 8/2000 | Firth et al. ............... 137/203 |
| 6,164,312 A | | 12/2000 | Bostedo et al. |
| 6,170,511 B1 | | 1/2001 | Bostedo et al. |
| 6,227,520 B1 | | 5/2001 | Huber, Jr. |
| 6,238,013 B1 | | 5/2001 | Koelzer |
| 6,267,135 B1 | | 7/2001 | Ho |
| 6,425,935 B1 | * | 7/2002 | Amato et al. ............... 95/1 |
| 7,338,550 B2 | | 3/2008 | Hoffman |
| 2003/0020329 A1 | | 1/2003 | Herbst et al. |
| 2005/0077779 A1 | * | 4/2005 | Goodell ............... 303/1 |
| 2007/0251781 A1 | | 11/2007 | Thomas |
| 2010/0215429 A1 | * | 8/2010 | Raye et al. ............... 403/408.1 |
| 2011/0278428 A1 | | 11/2011 | Raye et al. |

OTHER PUBLICATIONS

Jim Wilson; Air Compressor Automatic Drain Valve; http://www.paragoncode.com/shop/compressor/; 2001, 2002, 4 pages.

Paul Lapczynski; Automatic Compressor Drain; Toolmonger; http://toolmonger.com/2009/02/10/automatic-compressor-drain/; Feb. 10, 2009, 5 pages.

Haldex, Pilot Valve, offered for sale prior to Mar. 5, 2012, 1 page, Haldex, USA.

Haldex, Installation Instructions Dolly Module System (DMS-SA) with Brake Monitoring System (BMS-1) for Single Axle Dollies, Jul. 2010, 16 pages, Haldex, USA.

Haldex, Trailer Module System (TMS) with Brake Monitoring System (BMS-1), Jul. 2011, 16 pages, Haldex, USA.

Haldex, Air Valves—Automatic Drain Valve, Aug. 2008, 2 pages, Haldex Brake Products Corporation, USA.

Bendix, Service Data, Bendix® DV-2™ Automatic Reservoir Drain Valve, SD-03-2501, Mar. 2007, 4 pages, Bendix Commercial Vehicle Systems LLC, USA.

Stemco, Moisture Ejector Installation Instructions, Nov. 2006, 2 pages, Form 344, Stemco, USA.

European Search Report dated May 28, 2014 issued for related European Patent Application No. 14157668.6. (7 pgs.).

Information Sheet, "Pressure Protection Valve (PPV) Install Instructions", Haldex Commercial Vehicle Systems, Feb. 2010, 2 pgs.

Information Sheet, "The Haldex 3-Way Pilot Valve", Haldex Commercial Vehicle Systems, Feb. 2003, 2 pgs.

* cited by examiner

AUTOMATIC AIR TANK PURGE SYSTEM

CROSS-REFERENCE TO RELATED APPLICATIONS

This application is based on and claims priority to U.S. Provisional Application Ser. No. 61/772,822, filed on Mar. 5, 2013, which is incorporated herein by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention relates to compressed air tanks, and more specifically relates to automatically purging water and other contaminants from compressed air tanks.

2. Description of Related Art

Compressed air is used in a variety of applications. One example is pneumatic braking systems on vehicles such as buses, trucks, trailers, construction equipment, and recreational vehicles. To compress the air, an air compressor receives power from the engine of the vehicle and compresses air from the ambient environment into an air pressure tank or reservoir. The process of compressing air causes water vapor, oil, and other contaminants to collect in the bottom of the air pressure tank. If these contaminants are not removed from the air pressure tank on a regular basis, the contaminants can damage the air pressure tank or enter the braking system and damage the braking components.

Conventional air pressure tanks include a manual drain valve to remove contaminants from the air pressure tank. In a vehicle braking system, the driver of the vehicle should open the drain valve on a regular basis (e.g., whenever the engine is turned off). However, drivers often do not drain the contaminants from the air tank on a regular basis which can cause damage and the need for expensive repairs to the air tank and braking system.

Automatic purge valves have been developed to automatically purge the contaminants from the air tank based upon the occurrence of a specific event (e.g., air compressor turning on/off, ignition turning on/off, and periodic timer expiring). However, each known automatic purge valve requires electrical power or a connection to the air compressor to activate the automatic purge valve. There are situations and applications where the known automatic purge valves are inoperable because the air pressure tanks do not have access to electrical power or the air compressor (e.g., air pressure tanks on trailers).

BRIEF SUMMARY OF THE INVENTION

The present invention provides a system that automatically purges contaminants from an air pressure tank when the emergency or parking brakes of a vehicle, such as a bus, truck, tractor, trailer, dolly, construction equipment, or recreational vehicle, are set. For a trailer or dolly, if the towing vehicle is detached from the trailer or dolly, the system also automatically purges contaminants from the air pressure tank because the emergency brake line is disconnected. In one preferred embodiment, the system has a valve with an input port, an exhaust port, and a control port. The input port is in fluid connection with a drain on the pressurized air tank, and the control port is in fluid connection with an emergency brake line of the emergency brake system on the vehicle. When the emergency brakes are engaged (i.e., when the emergency brake line is not pressurized), the valve is in an open position such that the input port and the exhaust port are in fluid connection operable for air and contaminants from the pressurized air tank to be expelled from the pressurized air tank through the exhaust port. When the emergency brakes are not engaged (i.e., when the emergency brake line is pressurized), the valve is in a closed position such that the input port and exhaust port are not in fluid connection. In one preferred embodiment, the system also includes an air pressure regulator in fluid connection with the drain and the input port operable to stop air from passing through the valve when a pressure in the pressurized air tank reaches or falls below a threshold value. The system preferably has a manual drain valve that can be operated separately from the automatically operated valve described above. The invention also encompasses a method for automatically purging contaminants from the pressurized air tank of a vehicle.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF PREFERRED EMBODIMENT

The present invention provides a system that automatically purges contaminants from an air pressure tank when the emergency brakes of a vehicle are set. As used in the disclosure and claims herein, the term "vehicle" means any type of device used to transport passengers or cargo, including, but not limited to, buses, trucks, trailers, semi trucks, semitrailers, trains, construction equipment, tractors, farm equipment, and recreational vehicles. As used in the disclosure and claims herein, the terms "emergency brake" and "parking brake" are used interchangeably and mean any braking system in a vehicle used to keep the vehicle stationary when the vehicle is parked or not in use.

Figure 1:
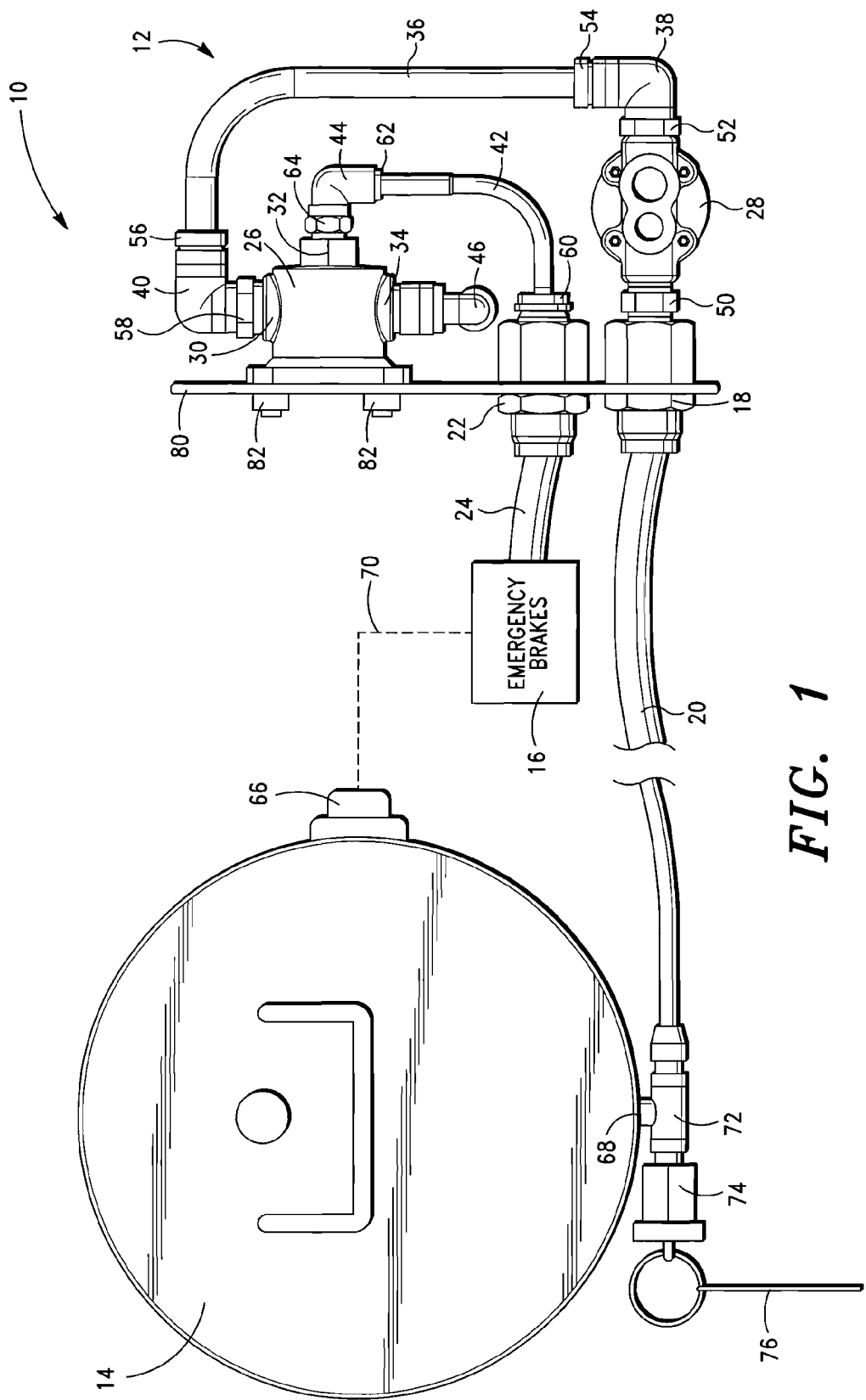
FIG. 1 shows a system for automatically purging a pressurized air tank of a vehicle braking system in accordance with the present invention.

Referring to FIG. 1, air tank purge system 10 includes automatic valve assembly 12, air tank 14, and emergency brake system 16. Air tank 14 is fluidly connected to air input 18 of automatic valve assembly 12 via drain line 20. Emergency brake system 16 is fluidly connected to control input 22 of automatic valve assembly 12 via emergency brake line 24.

As shown in FIGS. 1-4, automatic valve assembly 12 includes valve 26 and pressure regulator 28. Valve 26 includes an input port 30, a control port 32, and an exhaust port 34. Input port 30 is fluidly connected to assembly air input 18 via pressure regulator 28, flexible tubing 36, and elbow connectors 38, 40. Control port 32 is fluidly connected to assembly control input 22, via flexible tubing 42 and elbow connector 44. Exhaust port 34 is fluidly coupled to connector 46 and exhaust line 48. Air and contaminants are purged from air tank 14 through exhaust port 34. In a preferred embodiment, exhaust line 48 exhausts the contaminants from air tank 14 into the ambient air. In another embodiment, exhaust line 48 is fluidly coupled to a contaminant tank (not shown) to collect the contaminants to be discarded at a later time.

Figure 2:
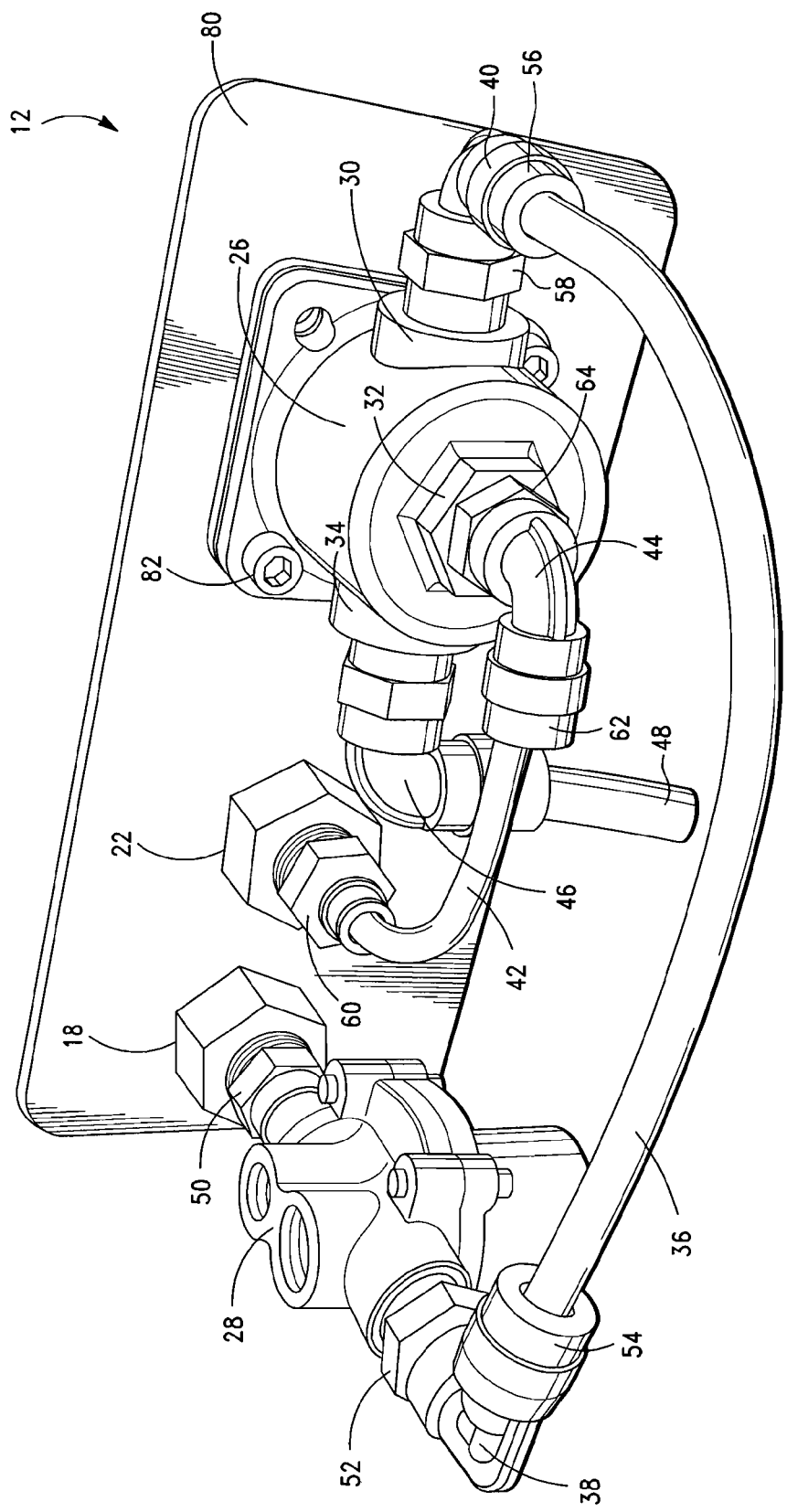
FIG. 2 shows a front perspective view of an automatic valve assembly of the system shown in FIG. 1.
Figure 3:
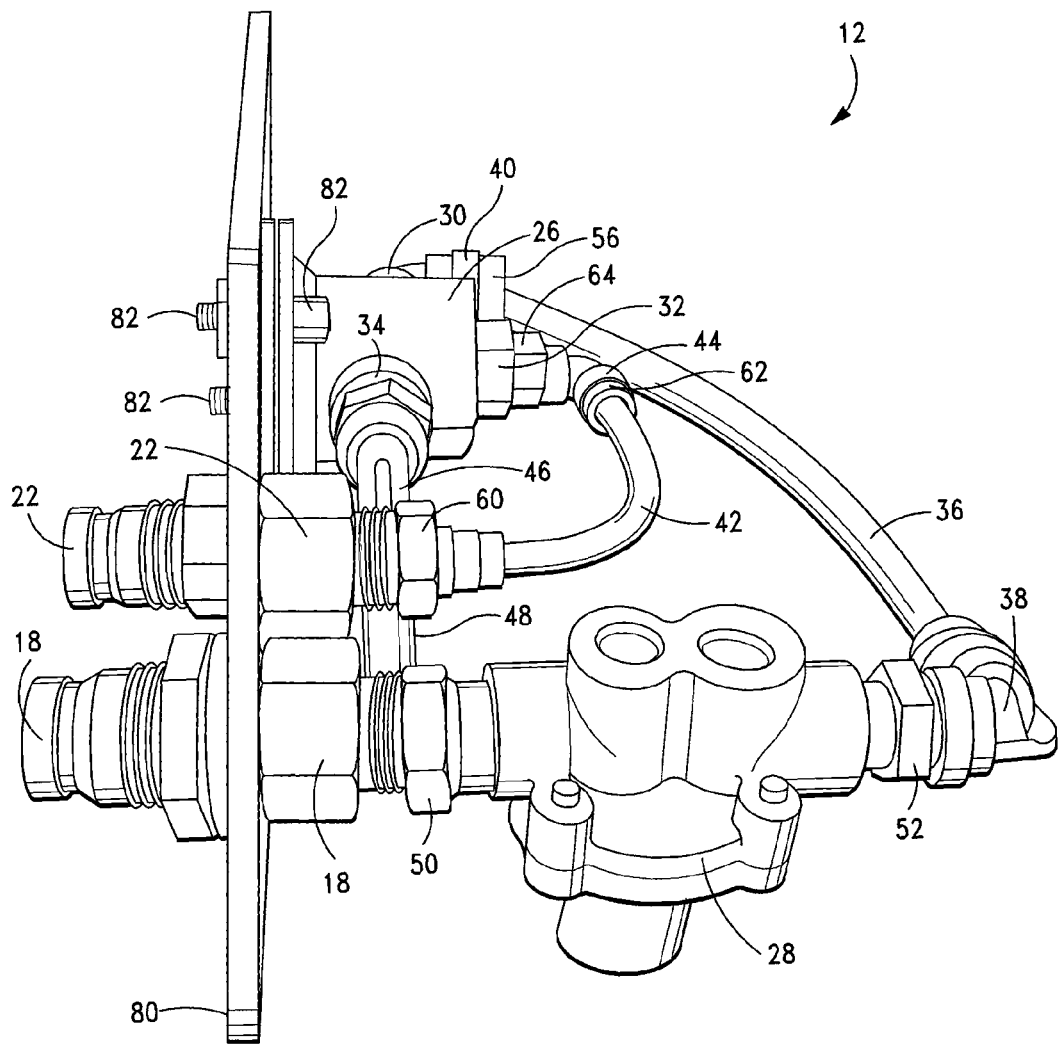
FIG. 3 shows a side perspective view of the automatic valve assembly.
Figure 4:
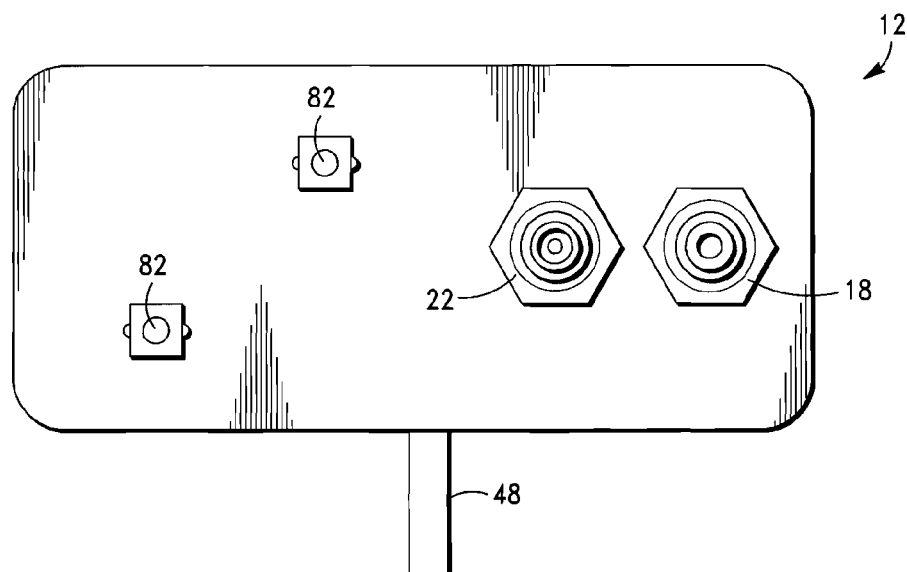
FIG. 4 shows a rear elevational view of the automatic valve assembly.

For one exemplary embodiment shown in FIGS. 2-4, air input 18 is fluidly connected to input port 30 in a manner to retain pressurized air between input port 30 and air input 18. Air input 18 is coupled to regulator 28 via threaded connector 50. Regulator 28 is coupled to elbow connector 38 via threaded connector 52. Flexible tubing 36 is connected to elbow connector 38 via compression coupler 54, and tubing 36 is coupled to elbow connector 40 via compression coupler 56. Input port 30 is connected to elbow connector 40 via threaded connector 58. Control input 22 is fluidly connected to control port 32 in a manner to retain pressurized air between control port 32 and control input 22. Control input 22 is coupled to flexible tubing 42 via threaded connector 60. Flexible tubing 42 is coupled to elbow connector 44 via compression coupler 62, and elbow connector 44 is coupled to control port 32 via threaded connector 64. Exhaust port 34 is coupled to exhaust line 48 via elbow connector 46. Additionally, although FIGS. 2-4 show one embodiment of connectors and air lines connecting the different components of automatic valve assembly 12, the disclosure and claims herein extend to any type, number, or orientation of components for fluidly connecting air input 18 to input port 30 and control input 22 to control port 32.

Flexible tubing 36, 42, exhaust line 48, emergency brake line 24, and drain line 20 are made of any suitable flexible tubing operable for pressurized fluid connections, and are preferably made of industrial standard brake tubing such as polyurethane flexible tubing. Elbow connectors 38, 40, 46, and 44 may be any suitable pneumatic fittings.

Air tank 14 has an air supply port 66 and a drain 68. Air tank 14 supplies compressed air to the vehicle for various operations, including the regular operational brake system (not shown) and emergency brake system 16, through air supply port 66. FIG. 1 shows supply line 70 connecting air tank 14 to emergency brake system 16 in phantom because there are typically other devices, lines, and regulators (not shown) connected between air supply port 66 and emergency brake system 16 such that air tank 14 is not directly connected to emergency brake system 16. Drain 68 is an open port such that water and contaminants can fall through the port and settle along drain line 20 before the purging process begins. In a preferred embodiment, drain 68 is on a low point or the bottom of air tank 14. In a preferred embodiment, drain 68 is coupled to a T-connector 72 operable to fluidly couple drain 68 to manual drain valve 74 and automatic valve assembly 12. Thus, manual drain valve 74 and automatic valve assembly 12 operate independently and contaminants can be purged from air tank 14 through manual drain valve 74 or automatic valve assembly 12 separately or concurrently. In another embodiment, manual drain valve 74 is not included and drain 68 is only connected to automatic valve assembly 12. Drain 68 is fluidly connected to automatic valve assembly 12 via drain line 20, and emergency brake system 16 is fluidly connected to automatic valve assembly 12 via emergency brake line 24. Air tank 14 is any suitable tank operable to store and provide air pressure (directly or indirectly) to the regular operational brake system (not shown), emergency brake system 16, and other components on the vehicle. An example of one suitable air tank is the Air Tank (Reservoir) model 19840 manufactured by Haldex and having a volume of approximately 1488 cubic inches.

Manual drain valve 74 is preferably a conventional manual drain valve. A spring in manual drain valve 74 keeps manual drain valve 74 in a closed position such that contaminants and air cannot pass through manual drain valve 74. Manual line 76 allows a person to pull and manually compress the spring in manual drain valve 74 and move manual drain valve 74 to an open position such that contaminants and air pass through manual drain valve 74 into the atmosphere. When manual line 76 is released, the spring in manual drain valve 74 expands to move manual drain valve 74 to the closed position.

Pressure regulator 28 allows air and contaminants to flow through it until the pressure in regulator 28 (and thus in air tank 14) drops to or below a threshold value. Thus, pressure regulator 28 allows enough air to be expelled to assure all of the contaminants are expelled from air tank 14 while retaining sufficient pressure within the air tank to operate pneumatic systems connected to the air tank, such as emergency brake system 16, without charging air tank 14. When the air pressure drops to or below the threshold value, pressure regulator 28 stops air from flowing through it. The threshold value can be a set physical value depending on the type of regulator used, or pressure regulator 28 may be adjustable. Pressure regulator 28 preferably has a threshold at a high enough value to allow air tank 14 to retain sufficient pressure for the emergency brake line to be pressurized without air tank 14 needing to be re-pressurized by the air compressor. In a preferred embodiment, the threshold is preferably in a range from about 80 psi to about 120 psi, and more preferably in a range from about 90 psi to about 100 psi. Although pressure regulator 28 is shown in FIGS. 2-4 to be between air input 18 and input port 30, regulator could be anywhere between drain 68 and where the contaminants are expelled (i.e., exhaust line 48). A suitable pressure regulator for purposes of the invention is Pressure Protection Valve model 90555396 manufactured by Haldex.

Emergency brake system 16 is a standard pneumatic vehicle emergency brake system. Emergency brake system 16 includes an emergency brake at each wheel and emergency brake lines (not shown) that fluidly connect the emergency brakes to air tank 14. Typically, in pneumatic vehicle braking systems, the emergency brakes are engaged by a spring in each emergency brake. To disengage the emergency brakes for vehicle operation, the emergency brake lines are pressurized to compress the spring and disengage the emergency brakes from preventing rotation of the wheels. The emergency brake lines are pressurized from air tank 14 and maintained at that pressure until the emergency brakes are set by a driver. When the driver sets the emergency brakes, the pressure from the emergency brake lines in emergency brake system 16 is released, and the springs in the emergency brakes expand to engage the emergency brakes. Emergency brake system 16 is fluidly connected to control port 32 via emergency brake line 24 such that control port 32 has substantially the same pressure as the emergency brakes in emergency brake system 16.

Figure 7:
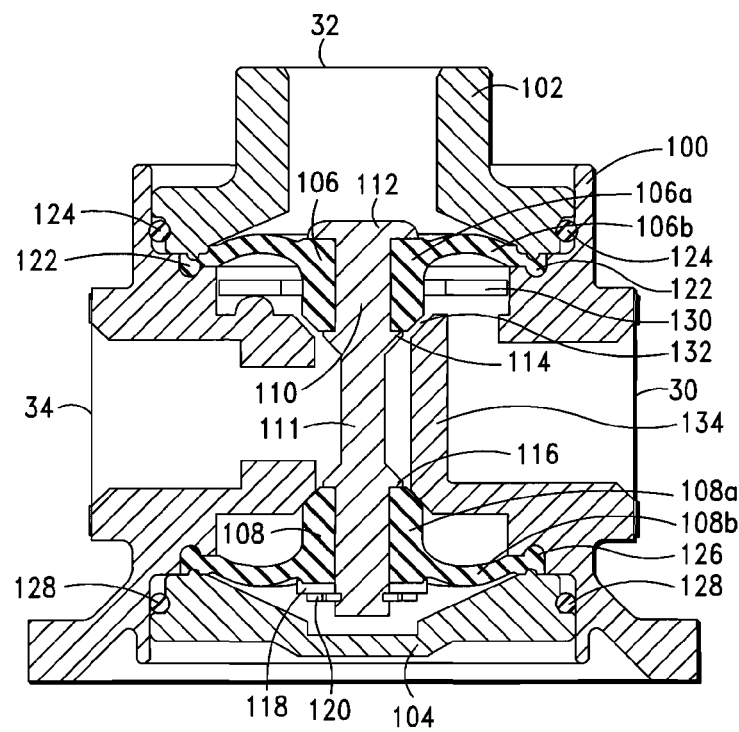
FIG. 7 shows a cross-sectional view of a valve of the automatic valve assembly taken through the line 7-7 in FIG. 2 in an open position.
Figure 8:
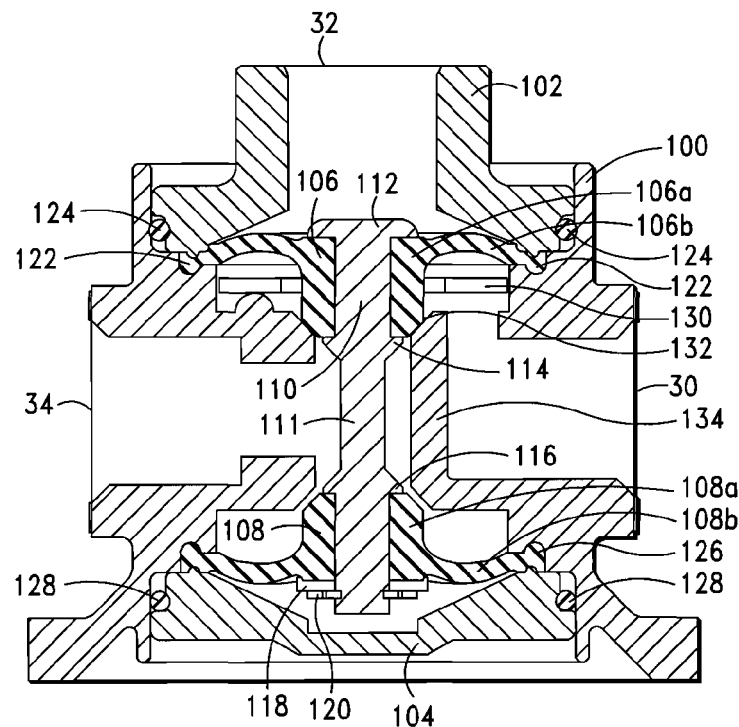
FIG. 8 shows a cross-sectional view of the valve shown in FIG. 7 in a closed position.

As shown in FIGS. 7-8, valve 26 includes a housing 100, a valve cap 102, a bottom plug 104, a top diaphragm 106, a bottom diaphragm 108, and a piston 110. Housing 100 defines openings for input port 30, control port 32, and exhaust port 34. Piston 110 is positioned within housing 100 below control port 32 and between input and exhaust ports 30, 34. Piston 110 passes through openings in top diaphragm 106 and bottom diaphragm 108. Piston 110 includes a generally cylindrical rod 111 along with a top 112 and diaphragm retainers 114 and 116 each extending radially outward from rod 111 and having a diameter that is greater than rod 111. Rod 111 has a groove opposite top 112 that receives a retaining ring 120.

A central cylindrical portion 106*a* of top diaphragm 106 is secured between top 112 and diaphragm retainer 114. Top diaphragm 106 has a flat circular portion 106*b* extending outward from cylindrical portion 106*a*. Valve cap 102 clamps a peripheral edge 122 of top diaphragm 106 between valve cap 102 and housing 100 such that diaphragm 106 forms a seal between valve cap 102 and housing 100. An o-ring seal 124 is also positioned between valve cap 102 and housing 100. Valve cap 102 may be secured in place within housing 100 by any means known in the art. A central cylindrical portion 108*a* of bottom diaphragm 108 is secured between diaphragm retainer 116 and a washer 118 that abuts retaining ring 120. Bottom diaphragm 108 has a flat circular portion 108*b* extending outward from cylindrical portion 108*a*. Bottom plug 104 clamps a peripheral edge 126 of bottom diaphragm 108 between bottom plug 104 and housing 100. An o-ring seal 128 is also positioned between bottom plug 104 and housing 100. Bottom plug 104 and o-ring seal 128 prevent air from entering or exiting the lower portion of housing 100. Because the lower portion of housing 100 is plugged, bottom diaphragm 108, diaphragm retainer 116, washer 118, and retaining ring 120 are not necessary and may be omitted from valve 26. Further, in lieu of bottom plug 104 and o-ring seal 128, the housing 100 may include an integral lower wall that prevents air from entering or exiting the lower portion of housing 100. Preferably diaphragms 106 and 108 are made from a relatively flexible, resilient material such that piston 110 and cylindrical portions 106*a*, 108*a* of diaphragms 106, 108 are free to move with respect to housing 100 in a direction that is aligned with air entering control port 32. A washer 130 is positioned within housing 100 between top diaphragm 106 and a central wall 134 separating input and exhaust ports 30, 34. Washer 130 prevents diaphragm 106 from collapsing when air is applied to the control port 32 to move the piston 110 to the closed position shown in FIG. 8.

Valve 26 has an open position (as seen in FIG. 7) and a closed position (as seen in FIG. 8) depending on the pressure within control port 32 and the pressure within input port 30. The pressure within control port 32 acts on the top 112 of piston 110 and an upper surface of diaphragm 106 to exert a downward force on piston 110 and diaphragm 106. The pressure within input port 30 acts on washer 130 and a lower surface of diaphragm 106 to exert an upward force on piston 110 and diaphragm 106. Valve 26 is in the open position shown in FIG. 7 when the upward force on piston 110 and diaphragm 106 caused by the pressure within input port 30 is greater than the downward force on piston 110 and diaphragm 106 caused by the pressure within control port 32. In the open position, an air passageway 132 is formed between cylindrical portion 106*a* of diaphragm 106 and central wall 134 of housing that allows air to flow between input port 30 and exhaust port 34. Valve 26 is in the closed position shown in FIG. 8 when the downward force on piston 110 and diaphragm 106 caused by the pressure within control port 32 is greater than the upward force on piston 110 and diaphragm 106 caused by the pressure within input port 30. In the closed position, cylindrical portion 106*a* of diaphragm 106 is forced into sealing engagement with central wall 134 to block air passageway 132 and prevent air from flowing between input port 30 and exhaust port 34.

Preferably, the surface area of the top 112 of piston 110 and top of diaphragm 106 on which the pressure in control port 32 acts is greater than the surface area of the bottom of washer 130 and bottom of diaphragm 106 on which the pressure in input port 30 acts such that the valve 26 may be in its closed position when the pressure within control port 32 is lower than the pressure within input port 30. Alternatively, the surface area of the top 112 of piston 110 and top of diaphragm 106 may be equal to or less than the surface area of the bottom of washer 130 and bottom of diaphragm 106 such that the pressure within control port 32 must be equal to or greater than the pressure within input port 30 to maintain valve 26 in its closed position.

The design of valve 26 is such that there is a threshold value of the pressure within control port 32. When the pressure within control port 32 is above that threshold value, the valve 26 is in its closed position, and when the pressure within control port 32 is below that threshold value, valve 26 is in its open position. The threshold value is preferably between approximately 0 to 30 psi within control port 32.

For example, when the air pressure in control port 32 falls below the threshold value because the emergency brakes are set and brake line 24 (FIG. 1) is not pressurized, the upward force on piston 110 caused by the air pressure in input port 30 overcomes the downward force on piston 110 caused by the pressure in control port 32 causing piston 110 to move up to the open position (as shown in FIG. 7). In the open position, input port 30 and exhaust port 34 are in fluid connection such that air and contaminants from air tank 14 can move from input port 30, through air passageway 132, around piston 110, and be expelled through exhaust port 34. When the air pressure in control port 32 is greater than the threshold value because the emergency brakes are not set and brake line 24 is pressurized, the downward force on piston 110 caused by the pressure in control port 32 overcomes the upward force on piston 110 caused by the pressure in input port 30 causing piston 110 to move down to the closed position shown in FIG. 8. In the closed position, top diaphragm 106 is pushed against central wall 134 thereby closing air passageway 132 such that input port 30 and exhaust port 34 are not in fluid connection. In the closed position, the circular portion 106*b* of diaphragm 106 also preferably rests against washer 130. An example of one suitable type of valve 26 is Pilot Valve (Suspension Control Valve) model 90554615 manufactured by Haldex. Valve 26 is preferably a pilot valve because it is operable to place input and exhaust ports 30, 34 in fluid communication based on the pressure within emergency brake line 24 and control port 32.

Figure 5:
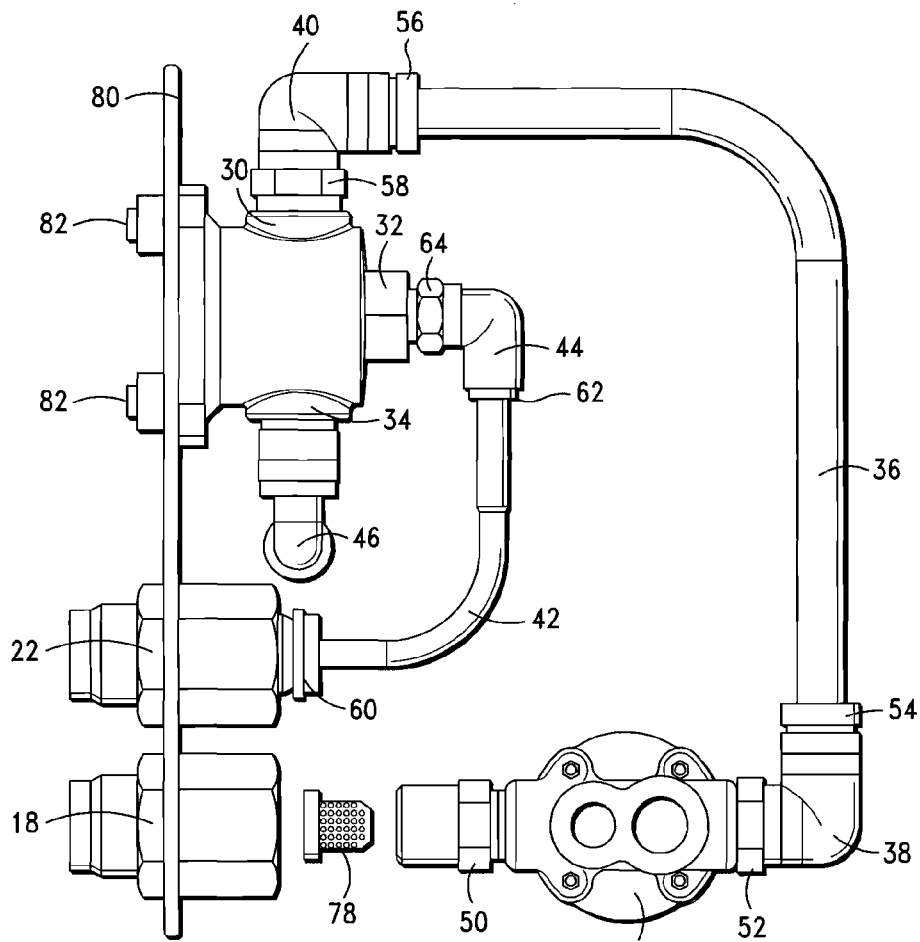
FIG. 5 shows a top plan view of the automatic valve assembly partially exploded to show an inline filter.

Referring to FIG. 5, automatic valve assembly 12 can include inline filter 78 to prevent larger contaminants from entering the components of automatic valve assembly 12 that may negatively impact the functionality of automatic valve assembly 12. Inline filter 78 can be any suitable filter or screen. In one preferred embodiment, automatic valve assembly 12 includes a quick release connector to easily access and clean or replace inline filter 78 (not shown). Although filter 78 is shown in FIG. 5 to be between air input 18 and regulator 28, filter 78 could be anywhere between drain 68 and valve 26.

As shown in the several different views of automatic valve assembly 12 in FIGS. 2-4, valve 26 is secured to a bracket 80 via fasteners 82. Bracket 80 provides structure to the components of automatic valve assembly 12, and also allows easier installation for automatic valve assembly 12. Air input 18 and control input 22 are provided to fluidly connect drain 68 and emergency brake system 16 to input port 30 and control port 32 respectively through bracket 80. Air input 18 and control input 22 preferably include a push-to-connect fitting, and more preferably a Bulkhead Push-To-Connect fitting model 66PMTBH-6-6 manufactured by Parking Fitting. In one exemplary embodiment, air input 18 and control input 22 are made from two threaded connector halves that are threaded together through bracket 80. However, air input 18 and control input 22 may be any type of pneumatic fitting operable to provide fluid connection through bracket 80.

FIG. 4 demonstrates the simplicity provided by automatic valve assembly 12 being secured to bracket 80. A person installing automatic valve assembly 12 only needs to connect air input 18 to drain 68 via a drain line 20 and connect control input 22 to emergency brake line 24. Thus, lines 20 and 24 can be connected to air input 18 and control input 22 without the installer being concerned with or understanding how the components of automatic valve assembly 12 are connected and without any of the components of automatic valve assembly 12 getting in the way.

Figure 6:
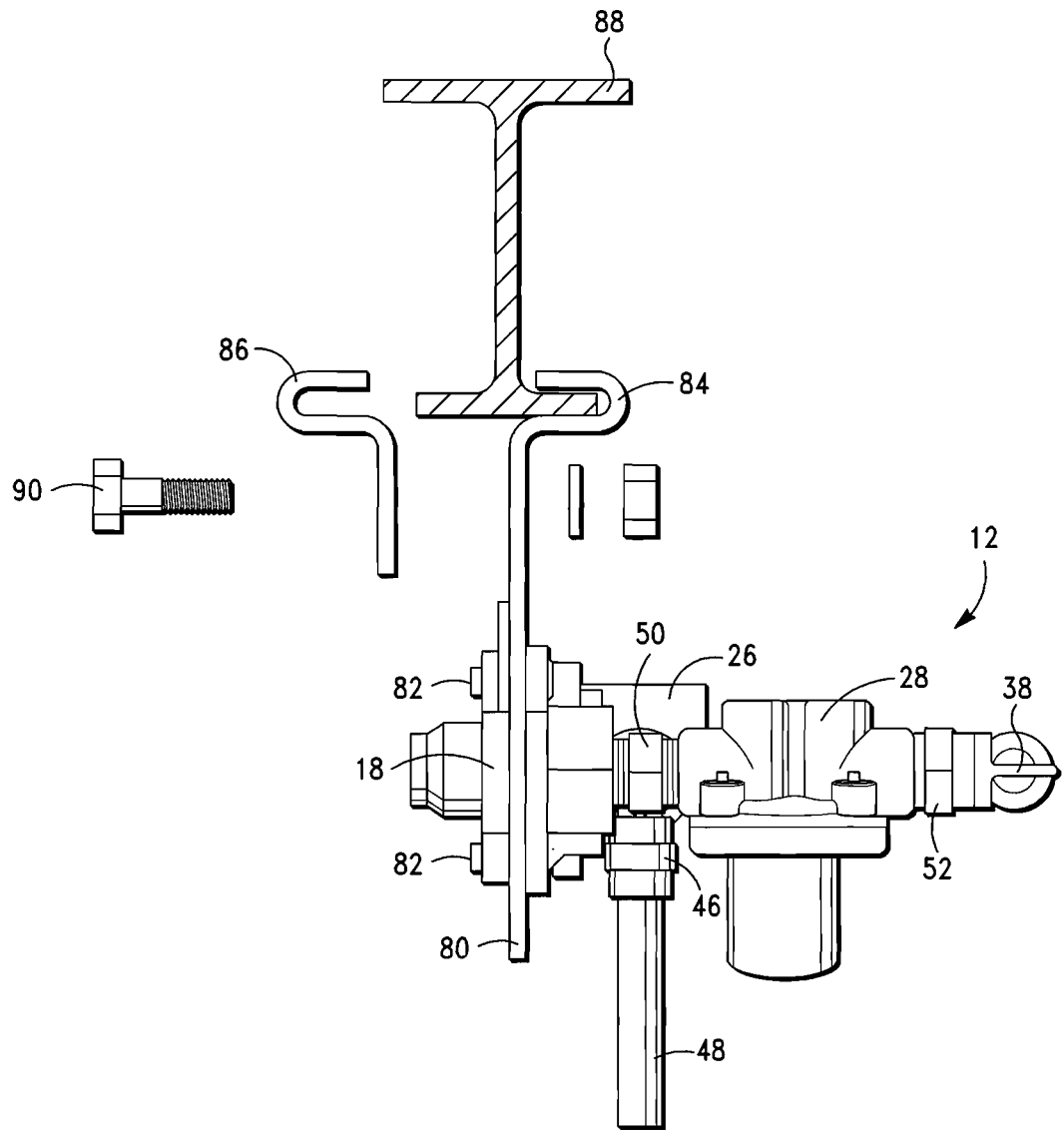
FIG. 6 shows a side elevational view of the automatic valve assembly with an attached mounting bracket for mounting the system to a trailer I-beam.

Referring to FIG. 6, in one preferred embodiment, bracket 80 includes attachment mechanisms 84, 86 to attach automatic valve assembly 12 to an I-beam 88 of a vehicle. In a preferred embodiment, attachment mechanism 84 is integral with bracket 80, and attachment mechanism 86 is secured to attachment mechanism 84 and bracket 80 via attachment means 90. In another embodiment, attachment mechanisms 84, 86 are not integral with bracket 80 and are secured to bracket 80 via attachment means 90 through at least one aperture in bracket 80 (not shown). Attachment mechanisms 84, 86 may be shaped differently than that shown in the figures and may be operable to attach automatic valve assembly 12 to other portions of a vehicle. In one alternative embodiment, automatic valve assembly 12 is attached to a larger bracket comprising several different mechanisms and assemblies as taught by U.S. Patent Application Publication No. 2010/0215429 which is incorporated herein by reference.

Automatic valve assembly 12 can be installed on any existing vehicle utilizing compressed air, or can be installed on new vehicles during manufacture. If installed during vehicle manufacture, emergency brake line 24 could be a separate dedicated line connecting emergency brake system 16 and automatic valve assembly 12. If installed on an existing vehicle, emergency brake system 16 typically does not have a spare line to run to automatic valve assembly 12. An existing emergency brake line (not shown) may be cut and a connector (e.g., a T-connector) is installed that fluidly connects the existing emergency brake line to emergency brake line 24.

To install automatic valve assembly 12 to an existing vehicle, an installer attaches the automatic valve assembly 12 to the vehicle. This can be done by attaching automatic valve assembly 12 to I-beam 88 using attachment mechanisms 84, 86 as shown in FIG. 6. Other attachment means may also be used. The installer then removes manual drain valve 74 from drain 68 and inserts a connector 72 into drain 68. If manual drain valve 74 is to remain on air tank 14, connector 72 comprises at least two connector ends, and manual drain valve 74 is attached to one end of connector 72 and a first end of drain line 20 is connected to another end of connector 72. If manual drain valve 74 is not to remain on air tank 14, connector 72 only comprises one connector end, and a first end of drain line 20 can be connected to connector 72. Alternatively, a first end of drain line 20 can be connected directly to drain 68, or a plug (not shown) could be connected to an end of connector 72. The other end of drain line 20 is then connected to air input 18.

The installer then cuts an emergency brake line (not shown) in emergency brake system 16, and installs a connector (not shown) to fluidly connect the severed emergency brake line and emergency brake line 24. Typically, the connector is a T-type connector, though other connectors may be used. Emergency brake line 24 is then connected to control input 22. Alternatively, if emergency brake system 16 provides an extra emergency brake line, the extra emergency brake line can be used as emergency brake line 24 and can simply be connected to control input 22.

A simple non-limiting example is now given to illustrate the operation of the present invention. For this example, we will assume air tank purge system 10 resides on an unpowered semitrailer that does not have access to the air compressor when parked, and the automatic valve assembly 12 is mounted to one of the trailer I-beams as shown in FIG. 6. Additionally, we will assume that air tank 14 maintains a pressure of 120 psi during operation and air pressure regulator 28 stops air flow at 90 psi. When the driver releases the parking/emergency brake, air from air tank 14 pressurizes the emergency brake lines in emergency brake system 16 to 120 psi. As a result of the emergency brake lines being pressurized to 120 psi, the springs in the emergency brakes are compressed such that the emergency brakes are disengaged. Emergency brake line 24 and control port 32 are also pressurized at 120 psi. At this pressure, valve 26 is in its closed position because the downward force on piston 110 caused by the pressure within control port 32 is greater than the upward force on piston 110 caused by the pressure within input port 30. This prevents air and contaminants from being expelled through automatic valve assembly 12. The emergency brakes and automatic valve assembly are not used while the semitrailer is moving.

When the trailer is parked, the driver typically sets the parking/emergency brake. This releases the pressure from the emergency brake lines in emergency brake system 16, causing the springs in the emergency brakes to expand, thereby engaging the emergency brakes. As a result, emergency brake line 24 and control port 32 are not pressurized, which causes valve 26 to move to its open position as the upward force on piston 110 caused by the pressure within input port 30 is greater than the downward force on piston 110 caused by the pressure within control port 32. When valve 26 is in its open position, air and contaminants travel from air pressure tank 14, through automatic valve assembly 12, and are expelled out of exhaust port 34. Valve 26 remains in the open position until the emergency brakes are disengaged (i.e., the emergency brake line is pressurized). With pressure regulator 28, air and contaminants continue to be expelled until the pressure in tank 14 drops below the threshold indicated by pressure regulator 28, here 90 psi.

Once the pressure in tank 14 reaches 90 psi, air pressure regulator 28 does not allow any more air to flow. The remaining air pressure (90 psi) is sufficient to release the parking/emergency brakes when the driver returns to the vehicle without waiting for air tank 14 to be charged. Without pressure regulator 28, air and contaminants would continue to flow until there was no air pressure remaining in air tank 14 (~0 psi). In this embodiment, air tank 14 would have to be charged before the parking/emergency brake can be disengaged for the trailer to be used.

If the air tank purge system 10 is located on a trailer or dolly that is towed by another vehicle, such as a semi-tractor, when the trailer or dolly is disconnected from the towing vehicle, the emergency brake line 24 is disconnected from control input 22. Disconnection of the emergency brake line 24 opens valve 26 to purge the air tank 14 in the same manner described above with respect to setting of the parking/emergency brake.

Thus, as described above, the present invention is directed to a system and method for automatically purging an air pressure tank each time the parking brake on the vehicle is set. The purging system does not require any electricity or connection to the compressor to turn off/on. The system is turned on when the parking brake is set, and turned off when the parking brake is released. The pressure regulator keeps enough pressure in the tank to allow pneumatic systems, such as the emergency brake system, to operate without charging the tank. Thus, the tank is automatically purged on a regular basis, thereby improving the performance and lifespan of the components.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A valve assembly for purging contaminants from a pressurized air tank on a vehicle, the valve assembly comprising:
    a valve comprising:
        an input port containing air at an input pressure;
        an exhaust port;
        a control port containing air at a control pressure; and
        a seal moveable between an open position, in which the input port and exhaust port are in fluid connection, and a closed position, in which the input port and exhaust port are not in fluid connection, wherein the seal is in the open position when an input force exerted on the seal by the input pressure is greater than a control force exerted on the seal by the control pressure, wherein the seal is not biased toward the open position when the control pressure is equal to the input pressure, wherein the seal is in the closed position when the control force is greater than the input force, and wherein the seal is not biased toward the closed position when the control pressure is equal to zero; and
    an air pressure regulator comprising an inlet and an outlet, wherein the inlet is fluidly connected with the exhaust port or the outlet is fluidly connected with the input port, wherein the air pressure regulator stops air and contaminants from flowing between the inlet and the outlet and from flowing between the input port of the valve and the exhaust port of the valve when a pressure of air at the inlet falls below a threshold value, and wherein air and contaminants flow between the inlet and the outlet and between the input port of the valve and the exhaust port of the valve when the pressure of air at the inlet is above the threshold value and the seal is in the open position.

2. The valve assembly of claim 1, wherein the outlet of the air pressure regulator is connected to the input port.

3. The valve assembly of claim 1, wherein the inlet of the air pressure regulator is connected to the exhaust port.

4. The valve assembly of claim 1, wherein the threshold value is in a range of between approximately 80 psi to 120 psi.

5. The valve assembly of claim 4, wherein the threshold value is in a range of between approximately 90 psi to 100 psi.

6. The valve assembly of claim 1, wherein the threshold value is modifiable.

7. The valve assembly of claim 1, wherein said seal comprises a diaphragm.

8. The valve assembly of claim 1, wherein the exhaust port is in fluid connection with ambient air.

9. The valve assembly of claim 1, wherein the valve and the air pressure regulator are coupled to a bracket.

10. The valve assembly of claim 9, wherein the bracket is operable to be connected to the vehicle.

11. The valve assembly of claim 9, wherein the bracket is operable to be connected to a trailer.

12. The valve assembly of claim 1, wherein the exhaust port is coupled with a holding tank that retains the expelled contaminants for later disposal.

13. The valve assembly of claim 1, wherein the valve comprises a housing defining the input, exhaust, and control ports and the seal comprises a diaphragm moveable between the closed and open positions, wherein the diaphragm seals against the housing when the diaphragm is in its closed position preventing air from flowing between the input and exhaust ports, and wherein there is a passageway between the diaphragm and housing through which air can flow from the input port to the exhaust port when the diaphragm is in its open position.

14. A system for purging contaminants from a pressurized air tank on a vehicle, the system comprising:
    a valve comprising:
        an input port in fluid connection with a drain on a pressurized air tank;
        an exhaust port;
        a seal moveable between an open position, in which the input port and exhaust port are in fluid connection, and a closed position, in which the input port and exhaust port are not in fluid connection; and
        a control port in fluid connection with an emergency brake line on a vehicle, wherein a first surface area of the seal on which a pressure in the control port acts is greater than a second surface area of the seal on which a pressure in the input port acts, and wherein:
  when the emergency brake line is not pressurized or the emergency brake line is disconnected from the valve, the seal is in the open position; and
  when the emergency brake line is pressurized, the seal is in the closed position, and wherein the seal is not biased toward the closed position when the emergency brake line is not pressurized or the emergency brake line is disconnected from the valve; and
an air pressure regulator comprising an inlet and an outlet, wherein the inlet is in fluid connection with at least one of the drain and the exhaust port, wherein the air pressure regulator is operable to stop air and contaminants from the pressurized air tank from flowing between the inlet and the outlet and from flowing between the input port of the valve and the exhaust port of the valve when a pressure in the pressurized air tank falls below a threshold value, and wherein air and contaminants from the pressurized air tank flow between the inlet and the outlet and between the input port of the valve and the exhaust port of the valve when the pressure in the pressurized air tank is above the threshold value and the seal is in the open position.

15. The system of claim 14, wherein said drain is positioned at a low point of the pressurized air tank.

16. The system of claim 14, wherein the air pressure regulator is connected between the drain and the input port.

17. The system of claim 14, wherein the air pressure regulator is connected to the exhaust port.

18. The system of claim 14, further comprising a manual drain valve coupled to the drain.

19. The system of claim 18, wherein the manual drain valve operates independently of the valve.

20. The system of claim 14, wherein the valve and the air pressure regulator are coupled to a bracket.

21. The system of claim 20, wherein the bracket is operable to be connected to the vehicle.

22. The system of claim 20, wherein the bracket is operable to be connected to a trailer.

23. The system of claim 14, wherein the exhaust port is coupled with a holding tank that retains the expelled contaminants for later disposal.

24. The system of claim 14, wherein the threshold value is in a range of between approximately 80 psi to 120 psi.

25. The system of claim 14, wherein the threshold value is in a range of between approximately 90 psi to 100 psi.

26. The system of claim 14, wherein the threshold value is modifiable.

27. The system of claim 14, wherein the valve comprises a housing defining the input, exhaust, and control ports and the seal comprises a diaphragm moveable between the closed and open positions, wherein the diaphragm seals against the housing when the diaphragm is in its closed position preventing air from flowing between the input and exhaust ports, and wherein there is a passageway between the diaphragm and housing through which air can flow from the input port to the exhaust port when the diaphragm is in its open position.

28. A method for automatically purging contaminants from a pressurized air tank on a vehicle, the method comprising the steps of:
  providing a valve comprising an input port in fluid connection with a drain on a pressurized air tank, a control port in fluid connection with an emergency brake line, an exhaust port, and a seal moveable between an open position, in which the input port and exhaust port are in fluid connection, and a closed position, in which the input port and exhaust port are not in fluid connection;
  providing an air pressure regulator in fluid connection with at least one of the drain and the valve;
  expelling air and contaminants from the pressurized air tank through the valve and through the air pressure regulator when an emergency brake on a vehicle is engaged, wherein when the emergency brake is engaged, the seal is in the open position such that the input port and the exhaust port are in fluid connection operable for air and contaminants from the pressurized air tank to be expelled from the pressurized air tank through the exhaust port, wherein the seal is not biased toward the open position when a pressure at the control port is equal to a pressure at the input port, and wherein the seal is not biased toward the closed position when the emergency brake is engaged; and
  stopping with the air pressure regulator the expulsion of air and contaminants from the pressurized air tank through the valve and through the air pressure regulator when an air pressure in the pressurized air tank drops below a threshold value.

29. The method of claim 28, further comprising the step of stopping the expulsion of air and contaminants from the pressurized air tank when the emergency brake on the vehicle is disengaged.

30. The method of claim 28, wherein said drain is positioned at a low point of the pressurized air tank.

31. The method of claim 28, wherein the threshold value is in a range of between approximately 80 psi to 120 psi.

32. The method of claim 28, wherein the threshold value is in a range of between approximately 90 psi to 100 psi.

33. The method of claim 28, wherein the threshold value is modifiable.

34. A system for purging contaminants from a pressurized air tank on a vehicle, the system comprising:
  emergency brakes on a vehicle; and
  a valve comprising:
    an input port in fluid connection with a drain on a pressurized air tank;
    an exhaust port;
    a control port in fluid connection with the emergency brakes; and
    a seal moveable between an open position, in which the input port and exhaust port are in fluid connection, and a closed position, in which the input port and exhaust port are not in fluid connection, wherein:
      when the emergency brakes are engaged, the seal is in the open position, wherein the seal is not biased toward the open position when a pressure at the control port is equal to a pressure at the input port; and
      when the emergency brakes are not engaged, the seal is in the closed position, and wherein the seal is not biased toward the closed position when the emergency brakes are engaged; and
  an air pressure regulator comprising an inlet and an outlet, wherein the inlet is in fluid connection with at least one of the drain and the exhaust port, wherein the air pressure regulator is operable to stop air and contaminants from the pressurized air tank from flowing between the inlet and the outlet and from flowing between the input port of the valve and the exhaust port of the valve when a pressure in the pressurized air tank falls below a threshold value, and wherein air and contaminants from the pressurized air tank flow between the inlet and the outlet and between the input port of the valve and the exhaust port of the valve when the pressure in the pressurized air tank is above the threshold value and the seal is in the open position.

35. The system of claim 34, wherein the seal comprises a diaphragm.

36. The system of claim 14, wherein the seal comprises a diaphragm.

37. The method of claim 28, wherein the seal comprises a diaphragm.

* * * * *